United States Patent [19]

Miller et al.

[11] Patent Number: 4,974,704
[45] Date of Patent: Dec. 4, 1990

[54] SELF-ENERGIZING DISC/ROTOR OR RIM BRAKE

[75] Inventors: Steven R. Miller; David F. Pedersen, both of Twin Falls, Id.

[73] Assignee: Pedersen Development Corporation, Twin Falls, Id.

[21] Appl. No.: 342,671

[22] Filed: Apr. 21, 1989

Related U.S. Application Data

[63] Continuation of Ser. No. 116,291, Nov. 3, 1987, abandoned.

[51] Int. Cl.$^5$ .............................................. B62L 1/06
[52] U.S. Cl. .............................. 188/24.140; 188/72.2
[58] Field of Search .................. 188/728, 72.2, 24.21, 188/24.22, 24.14, 24.15, 24.16

[56] References Cited

U.S. PATENT DOCUMENTS

| | | |
|---|---|---|
| 1,858,973 | 5/1932 | Steele . |
| 1,906,733 | 5/1933 | Bendix ............................ 188/72.2 X |
| 2,279,274 | 4/1942 | Johnson et al. ................ 188/72.8 X |
| 2,827,985 | 3/1958 | Butler .................................... 188/70 |
| 3,114,434 | 12/1963 | Pletscher ................................ 188/24 |
| 3,285,372 | 11/1966 | Rossmann .......................... 188/72.2 |
| 3,860,094 | 1/1975 | Breton .................................... 188/24 |
| 3,921,764 | 11/1975 | Mathauser .............................. 188/24 |
| 4,055,235 | 10/1977 | Tanaka et al. ......................... 188/24 |
| 4,163,482 | 8/1979 | Lauzier .................................. 188/24 |
| 4,538,707 | 9/1985 | Schoch ............................. 188/24.22 |
| 4,597,474 | 7/1986 | Nagano ............................ 188/24.21 |

FOREIGN PATENT DOCUMENTS 63022 5/1980 Japan .................................. 188/72.2

Primary Examiner—George E. A. Halvosa
Attorney, Agent, or Firm—Finnegan, Henderson, Farabow, Garrett & Dunner

[57] ABSTRACT

A self-energizing brake of the disc/rotor or rim type is disclosed which includes opposed rocker arms attached to a frame by a bolt or the like. The rocker arms support brake pads adjacent the disc/rotor or rim. Cantilever arms on each of said rocker arms extend opposite the brake pads and are connected to a pressure actuated cable. The rocker arms also terminate in a housing which is rotatable about the bolt. The housing encloses unitary helical ridges which mate with helical ridges on a cylinder fixedly secured to the frame by the bolt. The housing is axially movable relative to the bolt. The housing is sealed about the bolt by O-rings and contains a lubricant such as grease. When force is applied to the cable, the pads contact the rotating rim. Such rotation results in movement of the housing in an axial and rotational direction which, due to the interaction of the helical ridges, multiplies the force exerted on the rim by the brake pads. Release of the force on the cable results in a release of the force created by the interaction of the helical ridges and removes the force from the pads, thereby releasing braking action. A spring may be used to assist the release action and provide running clearance between the rim and the pads when the brake is released.

11 Claims, 2 Drawing Sheets

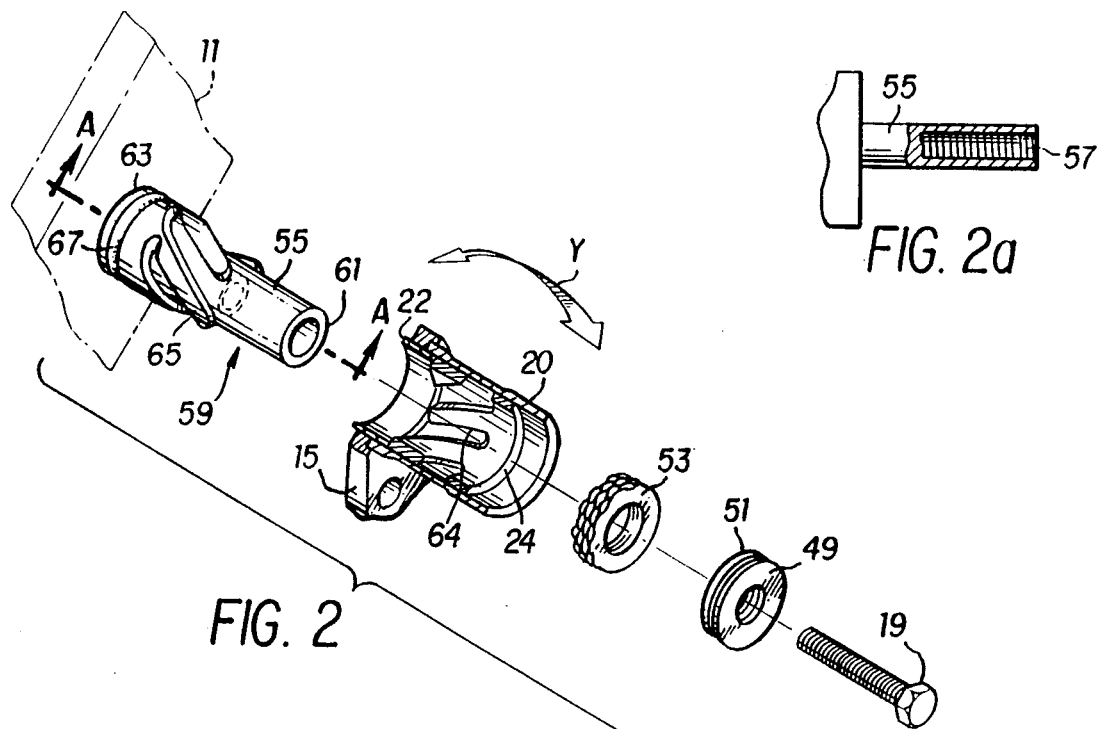
FIG. 2
FIG. 2a
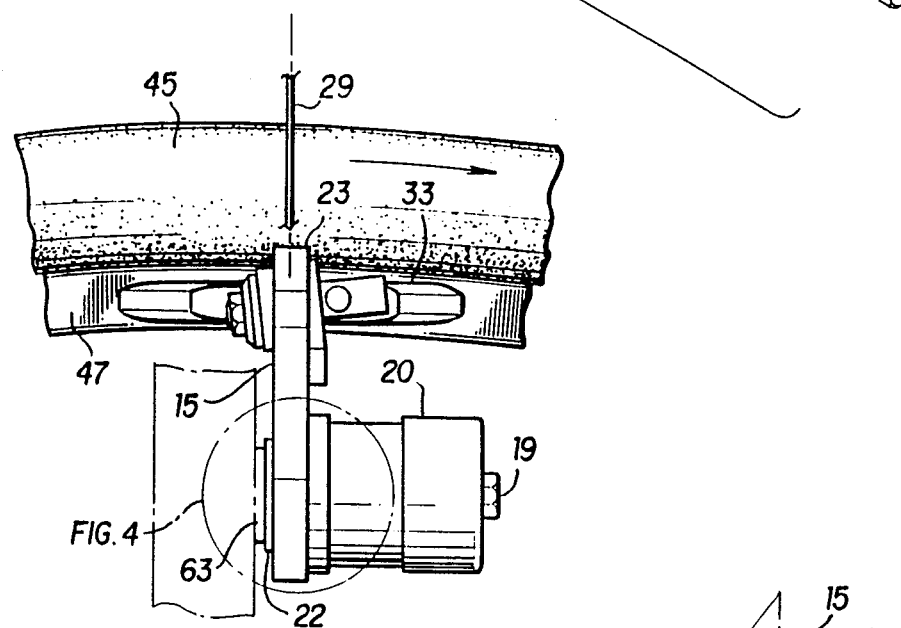
FIG. 3
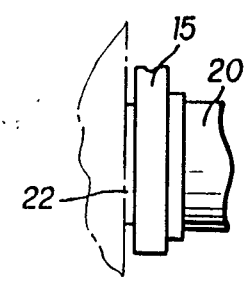
FIG. 4

SELF-ENERGIZING DISC/ROTOR OR RIM BRAKE

This application is a continuation of application Ser. No. 07/116,291, filed Nov. 3, 1987, now abandoned.

The present invention relates to brakes and, more particularly, to brakes of the disc/rotor or rim type which are self-energizing.

BACKGROUND OF THE INVENTION

In drum brakes for bicycles incorporated in the hub of the wheel, the drag in the shoe from the rotation of the wheel can be used to supplement the brake applying force, and drum brakes based on this principle work effectively. There are in existence some so-called "self-applying" brakes in which the drag from the rotation of the wheel causes an increase in braking force by the intermediary of a wedge, but these brakes today have not proved to be very effective.

The present invention relates to brakes of the disc/rotor or rim brake type that use the free power brake effect of the wheels' own rotating force to cause "self-energized" braking, thereby multiplying the braking force. For purposes of explanation, in the illustrated example this mechanism is shown used with bicycle cantilever type brakes. It is to be understood that the present invention is not limited to this particular type of brake since it could be used for other types of brakes which use a rotor or wheel with associated brake pads.

An object of the present invention is to provide a selfbraking mechanism in which less actuating force is required in proportion to the braking force provided by self-energizing the apparatus.

A further object of the invention is to provide a self-energizing brake which requires a minimum number of parts.

Yet another object of this invention is to provide a self-energizing braking system which retrofits existing braking systems.

A still further object of this invention is to improve modulation of the braking action for rider control and safety.

These and other objects of the invention will become apparent from the following description taken together with the drawings.

SUMMARY OF THE INVENTION

The present invention provides a self-energizing brake of the disc/rotor or rim type which comprises a rocker arm, means for rotatably securing the rocker arm in a fixed position relative to a disc/rotor or rim, a friction pad mounted on the rocker arm adjacent the disc/rotor or rim, means for initiating a force for rotating the rocker arm so as to move the friction pad against the rim, a post fixedly mounted by the means for securing the rocker arm with the post having a first plurality of helical ridges connected to and extending axially about the periphery of the post. A housing is mounted to a movable rocker arm and encloses the post and the first plurality of helical ridges. It is to be noted that the housing may be integral with the rocker arm. A second plurality of helical ridges are secured within and extend axially within the housing so that the first and second helical ridges are in contact in a mating relation. The housing is axially movable. An initial actuating force, F1, is applied to the rocker arm so as to bring the pad against the rim. The friction of the pad on the rim creates a force which tends to move axially as well as rotate the housing. This action causes an increased pressure contact by way of interaction between the two helical surfaces so as to provide a force, F2, according to the pitch angle of the helical ridges, thereby multiplying the braking force exerted against the rim. Release of the initial force F1 allows the counterforce of the spring to simultaneously release force F2 and the associated multiplying mechanism.

BRIEF DESCRIPTION OF THE DRAWINGS

FIG. 2 is an exploded view of one of the self-energizing components used in the present invention;

FIG. 2a is a side elevational view of the post used in FIG. 2;

FIG. 3 is a partial side elevational view of the mechanism of FIG. 2 when the brakes are applied;

FIG. 4 is a partial sectional view of the mechanism of FIG. 3 illustrating the position of the mechanism when the brakes are at rest; and FIG. 5 is a partial sectional view of the self-energizing mechanism illustrating relative movement of the components therein.

DETAILED DESCRIPTION OF THE DRAWINGS

Figure 1:
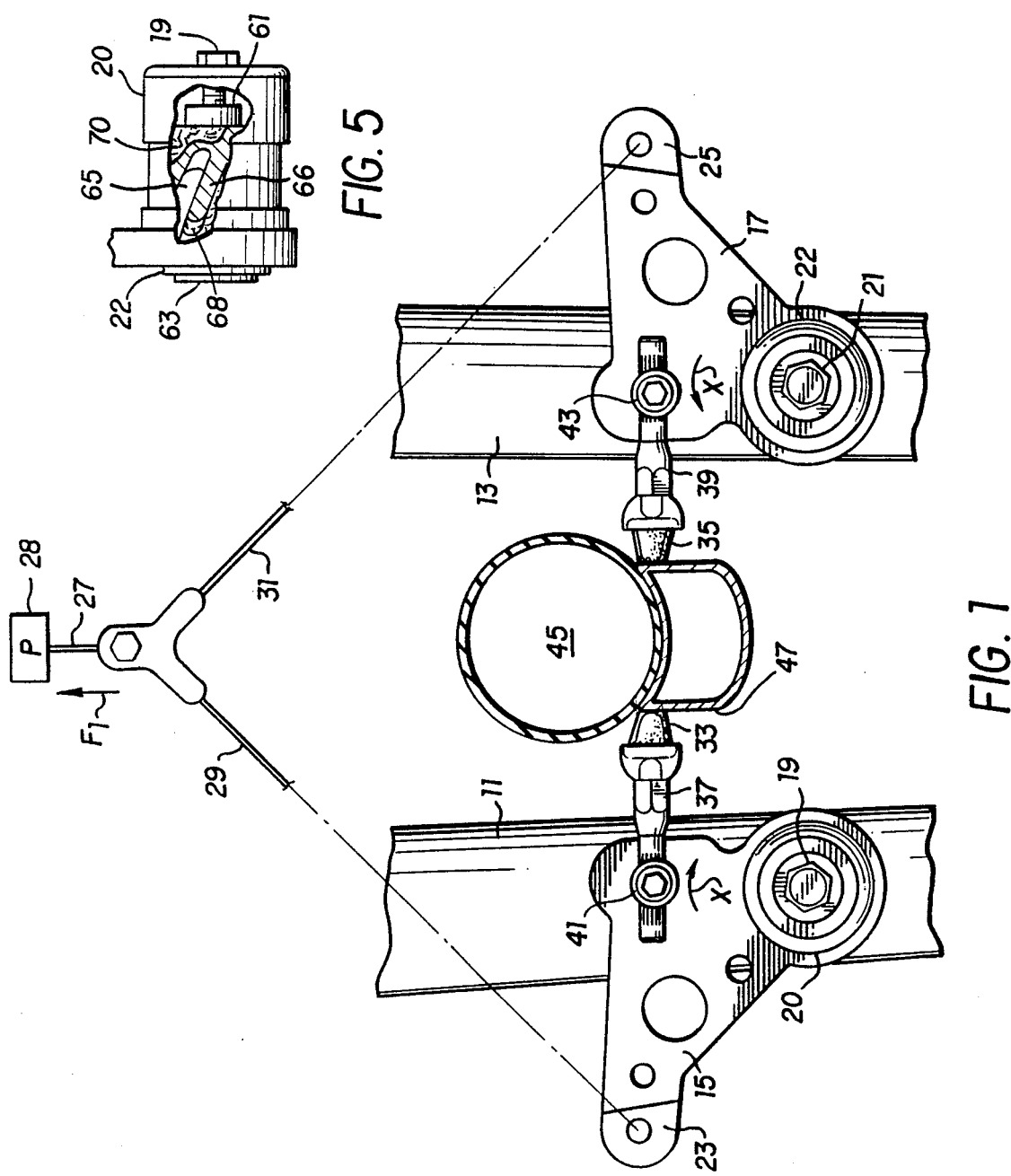
FIG. 1 is a diagrammatic illustration of the braking system of the present invention.

FIG. 1 is a diagrammatic view showing the use of the mechanism of the present invention relative to the front wheel of a bicycle. While a bicycle system is disclosed for purposes of describing the invention, it is to be understood that the invention is not limited to the use of the present braking system on a bicycle.

Frames 11 and 13 constitute the forks for supporting the front wheel 45 of the bicycle. Rocker arms 15 and 17 are secured in a pivotal fashion to frames 11 and 13 by means of bolts 19 and 21 which pass through respective housings 20 and 22. This structure will be more completely described below.

Rocker arms 15 and 17 include terminal cantilever arms 23 and 25. These arms are connected to brake cable 27 by means of connecting cables 29 and 31. Pressure exerted through cable 27 causes each of the arms to rotate about a pivot point created by bolt 19 and 21. Pressure is applied through a mechanism 28. In the particular bicycle application, this could be a hand lever. Pressure could also be applied to the rocker arms in another mechanical fashion or the rocker arms could be pneumatically, hydraulically or electrically actuated.

When the pressure is applied to cable 27 a force F1 causes rocker arm 15 to rotate clockwise and rocker arm 17 to rotate counterclockwise. Brake pads 33 and 35 are connected to rocker arms 15 and 17 by means of posts 37 and 39. These posts pass through bolts 41 and 43 which, as in standard procedure, secure posts 37 and 39 in a desired position after they are adjusted for the particular application for which they are being used. These posts are both rotatable on their own axis and movable relative to the vertical axis of bolts 41 and 43 for adjustment purposes. The rotation caused by force F1 brings pads 33 and 35 into rim 47. Force F1 also causes axial movement of housing 20, which, via the helical ridges, multiplies the braking force, thus creating the self-energizing feature of this invention (to be specifically discussed below).

FIG. 2 is an exploded view of one of the mechanisms illustrated in FIG. 1 and specifically relates to the mechanism used with rocker arm 15.

Bolt 19 passes through spacer 49, which includes O-ring 51. Adjacent to spacer 49 is compression spring 53, which fits within housing 20 and seats on ledge 24 when assembled. In assembled position the outer end of cylinder 61 passes through spring 53 and abuts spacer 51. Housing 20, which includes helical ridges 64, terminates at the far end in flange 22.

Mounting post 55 is secured to frame 11 by welding or the like, and includes interiorly threaded borehole 57, as more clearly seen in FIG. 2a. Male member 59, which fits about mounting post 55, includes cylindrical tube 61 and terminates in base 63, which bears against frame member 11. O-ring 63 is used for sealing purposes when male member 59 mates with housing 20. Helical ridges 65 extend outwardly from base 63 and are integral with the base and cylinder 61. When housing 20 is placed over cylinder 61, helical ridges 64 mate with helical ridges 65. As illustrated, housing 20 is integral with and moves axially with and rotates with rocker arm 15.

When the apparatus of FIG. 2 is assembled, male member 59 is secured in a fixed stationary position to frame 11 when bolt 19 is mated with threaded bore 57 and tightened. Housing 20 is axially and rotatably movable relative to male member 59, as indicated by arrow Y.

FIG. 5 is a partial sectional view of the assembled apparatus showing the relationship of mating helical ridges 65 and 66, with the dotted line 68 indicating the relative position of helical ridge 66 when the brake is at rest. Axial movement of the associated rocker arm causes movement of helical ridge 66 to the position shown in solid lines. As also indicated, it is preferable to provide a lubricant 70, such as grease, within the assembled device so as to assure freedom of operation.

When force F1 is applied through the cable structure so as to rotate the rocker arms in a direction indicated by the arrows X, the brake pads are brought into the rim. This frictional action further moves housing 20 and the rocker arms via the helical ridges in an axial and rotational direction. In the illustration of FIG. 2, this creates a force F2 in the direction shown by arrow Y. This, in turn, through the interaction of the helical ridges, applies a greater braking force on the rim of the wheel.

FIG. 3 is a diagrammatic showing wherein the brake pads 33 are into contact with rim 11. As illustrated, the mechanism specifically described relative to FIGS. 2 and 5 is in the position as shown. When force F1 is applied, housing 20 moves axially as a result of the frictional pressure between the brakes and the rim so as to effectively move housing 20, thus causing the interaction of the helical ridges which supply the force described above.

FIG. 4 is a showing of the mechanism when the brakes are at rest. Flange 22 is of a dimension so as to limit the movement of housing 20 relative to male member 59. It is to be understood that the illustration of FIG. 5 is exaggerated since the relative movement between the helical ridges is quite small and large axial movement of the housing is not required to cause the self-energization feature of the invention.

When the force F1 is released, it has been found that the force F2 is also released since the force F2, by itself, is not sufficient to maintain the pads in contact with the rim. Thus, housing 20 returns to its at rest position. Although this occurs when no spring is used, spring 53 is used to return the pads clear of the rim, providing running clearance between the rim and the pads. When housing 20 moves axially from the rest position, spring 53 is compressed. Release of force F1 causes spring 53 to bias housing 20 away from end cap 49. This further assures that there will be no wedging or "lockup," as can occur in previously proposed self-energizing bicycle brakes.

As will be apparent, the pitch angle of the helical ridges will have a direct bearing on the amplitude of the exerted force F2. The pitch angle for use with the present invention is preferably between 20° and 70°, with a pitch angle between 40° and 45° being preferred.

The above description and drawings are illustrative, only, since variations and equivalents of the specific structure could be used without departing from the invention, the scope of which is to be limited only by the following claims.

We claim:

1. In a bicycle having a frame and at least one tire mounted on a rim, a self-energizing brake comprising:
   a pair of rocker arms each having a friction pad extending therefrom;
   means for rotatably mounting each of said pair of rocker arms adjacent opposite sides of said tire rim such that said friction pads are movable into and out of contact with respective sides of said rim as said rocker arms are rotated;
   a pair of tubular members extending transversely from and fixed to said mounting means on opposite sides of said tire rim, each said tubular member having an outer surface configured with a plurality of first helical ridges thereon;
   a housing integral with and extending transversely from each of said rocker arms and surrounding a respective one of said tubular members, said housing having an inner surface configured with a plurality of second helical ridges which mate with said first helical ridges of respective ones of said tubular members to move said housings axially along and to rotate said housings relative to the respective tubular member as said friction pads engage the tire rim and are urged in the direction of rotation of said rim, said urging of said friction pads causing the rotational and axial movement of the housings to increase the pressure of said friction pads against said rim thereby providing self-energization of said brake.

2. The bicycle of claim 1, wherein said mounting means comprises a pair of stays extending from said frame on opposite sides of said tire rim, and means for securing said tubular members to respective ones of said stays.

3. The bicycle of claim 2, having said securing means includes a tubular mounting post, having a threaded interior surface, fixed to and extending from each of said stays, and a threaded bolt received in said tubular mounting post, said tubular member being fixedly held on said tubular mounting post by said threaded bolt.

4. The bicycle of claim 1, including spring means, disposed in each said housing, for biasing said housing axially along said tubular member to rotate said rocker arm and move said friction pad out of contact with said tire rim.

5. The bicycle of claim 1, including means for sealing said first and second mating helical ridges.

6. The bicycle of claim 5, including lubricating means disposed between said first and second mating helical ridges.

7. The bicycle of claim 1, wherein said first and second helical ridges have a pitch angle between about 20°–70° and preferably between about 40°–45°.

8. A self-energizing brake kit for installation on a bicycle having a frame, at least one tire mounted on a rim, and pair of tubular mounting posts fixedly extending from said frame on opposite sides of the tire rim, comprising:

a pair of rocker arms each having a friction pad extending therefrom for selectively engaging with opposite sides of the tire rim when mounted on the bicycle to provide a braking action to the tire and rim;

means for rotatably mounting each of said pair of rocker arms on a respective one of the mounting posts;

a pair of tubular members for being fixedly mounted on the tubular mounting posts, each said tubular member having an outer surface configured with a plurality of first helical ridges thereon;

a housing, integral with and extending transversely from each of said rocker arms, for surrounding a respective one of said tubular members, said housing having an inner surface configured with a plurality of second helical ridges for mating with said first helical ridges and for moving said housings axially along and rotating said housings relative to said respective tubular member as the respective one of said friction pads is engaged by the rim and urged in the direction of rotation of the rim, said urging of said friction pad by the rim causing the rotational and axial movement of the housing to increase the pressure of said friction pads against the rims to thereby provide self-energization of the brake.

9. The self-energizing brake kit of claim 8, wherein said mounting means further includes means for holding said tubular members on said tubular mounting posts.

10. The self-energizing brake kit of claim 9, including spring means for biasing said housing in a first axial direction relative said respective tubular member with said first and second helical ridges engaged with one another.

11. The self-energizing brake kit of claim 9, wherein said first and second helical ridges have a pitch angle between about 20°–70° and preferably between about 40°–45°.

* * * * *